US012747382B2

(12) United States Patent
Clarke et al.

(10) Patent No.: US 12,747,382 B2
(45) Date of Patent: Sep. 29, 2026

(54) COMPOSITIONS AND SYSTEMS FOR ELASTIC TURBULENCE

(71) Applicant: Schlumberger Technology Corporation, Sugar Land, TX (US)

(72) Inventors: Andrew Clarke, Cambridge (GB); Anand Raghavan, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 96 days.

(21) Appl. No.: 18/883,493

(22) Filed: Sep. 12, 2024

(65) Prior Publication Data

US 2025/0092298 A1 Mar. 20, 2025

(30) Foreign Application Priority Data

Sep. 14, 2023 (GB) .................................... 2314051

(51) Int. Cl.
*C09K 5/20* (2006.01)
*C08L 33/26* (2006.01)
(Continued)

(52) U.S. Cl.
CPC ................ *C09K 5/20* (2013.01); *C08L 33/26* (2013.01); *H01M 8/04029* (2013.01);
(Continued)

(58) Field of Classification Search
CPC .. C09K 5/20; C09K 5/10; C08L 33/26; C08L 2205/025; H01M 8/04029; H01M 8/188; H01M 10/6551; H01M 2300/0037; B01L 2400/086; F15D 1/0005; F28F 9/24; Y10S 165/529; F24S 10/00
(Continued)

(56) References Cited

U.S. PATENT DOCUMENTS

| | | | |
|---|---|---|---|
| 4,472,255 | A | 9/1984 | Millington et al. |
| 2002/0093878 | A1 | 7/2002 | Steinberg et al. |

(Continued)

OTHER PUBLICATIONS

Boudara, V. et al., Nonlinear Rheology of Polydisperse Blends of Entangled Linear Polymers: Rolie-Double-Poly Models, Journal of Rheology, Jan. 1, 2019, pp. 71-91, vol. 63, No. 1.

(Continued)

*Primary Examiner* — Allison Bourke
*Assistant Examiner* — Robert Gene West
(74) *Attorney, Agent, or Firm* — Kyle R. Miiller

(57) ABSTRACT

A fluid composition which is able to exhibit elastic turbulence while pumped through a flow path which compels changes of direction of flow streamlines and comprise a solution of two or more flexible linear polymers in two categories. The first category has an average molecular weight of at least 10 MegaDaltons and the second category has an average molecular weight in a range from 0.25 to 5 MegaDaltons. The concentration of the first polymer is sufficient to enable elastic turbulence with or without the second category. The concentration of the second category is greater than that of the first. When flowing under low shear towards or away from a chamber where the flow path will induce elastic turbulence, the second category polymer reduces elastic instabilities and consequent pressure drop, thereby reducing pumping energy requirement.

20 Claims, 8 Drawing Sheets

(51) Int. Cl.
*H01M 8/04029* (2016.01)
*F15D 1/00* (2006.01)
*F28F 9/24* (2006.01)
*H01M 10/6551* (2014.01)

(52) U.S. Cl.
CPC ... *B01L 2400/086* (2013.01); *C08L 2205/025* (2013.01); *F15D 1/0005* (2013.01); *F28F 9/24* (2013.01); *H01M 10/6551* (2015.04); *Y10S 165/529* (2013.01)

(58) Field of Classification Search
USPC .......................................................... 429/437
See application file for complete search history.

(56) References Cited

U.S. PATENT DOCUMENTS

| | | | | |
|---|---|---|---|---|
| 2018/0177707 | A1* | 6/2018 | Belkovi | C08J 3/005 |
| 2020/0086286 | A1 | 3/2020 | Snezhko et al. | |
| 2023/0340210 | A1* | 10/2023 | Gasparavicius | B01J 13/046 |
| 2025/0093110 | A1 | 3/2025 | Clarke | |
| 2025/0096288 | A1 | 3/2025 | Clarke | |
| 2025/0198711 | A1 | 6/2025 | Clarke | |

OTHER PUBLICATIONS

Davoodi, M. et al., Secondary flows due to finite aspect ratio in inertialess viscoelastic Taylor-Couette flow, Journal of Fluid Mechanics, Oct. 30, 2018, pp. .823-850, vol. 857.
Debrulera, C. et al., Sulfonate-Functionalized Viologen Enabling Neutral Cation Exchange, Aqueous Organic Redox Flow Batteries toward Renewable Energy Storage, ACS Energy Letters, 2018, pp. 663-668, vol. 3, No. 3.
Dris, I.M. et al., Experimental and Theoretical Observations of Elastic Instabilities in Eccentric Cylinder Flows: Local Versus Global Instability, Journal of Non-Newtonian Fluid Mechanics, Dec. 1, 1998, pp. 1-58, vol. 80, No. 1.
Groisman, A. et al., Elastic Turbulence in a Polymer Solution Flow, arXiv:nlin/0104052v1, Apr. 22, 2001, pp. 1-14.
Jin, S et al., A Water-Miscible Quinone Flow Battery with High Volumetric Capacity and Energy Density, ACS Energy Letters, 2019, pp. 1342-1348, vol. 4, No. 6.
Kerr, E.F., et al., High Energy Density Aqueous Flow Battery Utilizing Extremely Stable, Branching-Induced High-Solubility Anthraquinone near Neutral pH, ACS Energy Letters, 2023, pp. 600-607, vol. 8, No. 1.
LV, XL.L. et al., Dextrosil-Viologen: A Robust and Sustainable Anolyte for Aqueous Organic Redox Flow Batteries, ACS Energy Letters, 2022, pp. 2428-2434, vol. 7, No. 8.
Magda, J.J. et al., A Transition Occurring in Ideal Elastic Liquids During Shear Flow, Journal of Non-Newtonian Fluid Mechanics, Oct. 2, 1988, pp. 1-19, vol. 30, No. 1.
Olagunju D.O., Instabilities and Bifurcations of Von Karman Similarity Solutions in Swirling Viscoelastic Flow, Zeitschrift fur angewandte Mathematik und Physik ZAMP, 1995, pp. 224-238, vol. 46.
Rubinstein, et al., Chapter 2, Polymer Physics, Oxford University Press, 2003.
Safronov, A.P. et al., Hydrogels Based on Polyacrylamide and Calcium Alginate: Thermodynamic Compatibility of Interpenetrating Networks, Mechanical, and Electrical Properties, Biomimetics, Jun. 28, 2023, pp. 1-18, vol. 8, No. 3.
Steinberg, V., Elastic Turbulence: An Experimental View on Inertialess Random Flow, Department of Physics of Complex Systems, Annual Review of Fluid Mechanics, Jan. 5, 2021, pp. 27-58, vol. 53.
Tran, E. et al., The Relaxation Time of Entangled HPAM Solutions in Flow, Journal of Non-Newtonian Fluid Mechanics, Jan. 2023, pp. 1-4, vol. 311.
Copeland, Daniel et al., Elastic turbulence influences and convective heat transfer within a miniature viscous disk pump, International Journal of Heat and Mass Transfer, Jan. 20, 2017 (Online publication date), vol. 108, pp. 1764-1774.
Macdonald, Michael J. et al., Shear rheology of polymer solutions near the critical condition for elastic instability, Rheologica Acta, 1997, vol. 36, pp. 97-109.

* cited by examiner

COMPOSITIONS AND SYSTEMS FOR ELASTIC TURBULENCE

CROSS-REFERENCE TO RELATED APPLICATIONS

The subject disclosure claims priority from GB Application No.: GB2314051.0, filed on Sep. 14, 2023, herein incorporated by reference in its entirety.

FIELD

This disclosure is concerned with compositions able to display elastic turbulence and with methods and systems using elastic turbulence.

BACKGROUND

The present disclosure uses the phenomenon of elastic turbulence. It is of course well known that Newtonian fluids such as water can undergo either laminar flow or turbulent flow. Such turbulent flow may be referred to as inertial turbulence. Conditions for laminar and turbulent flow are often expressed by Reynolds number which is a ratio of inertial to viscous forces within a fluid. Reynolds number has no dimensions because it is a ratio. At Reynolds number above about 2000 there is inertial turbulent flow. At Reynolds number below about 1500 a Newtonian fluid is in a state of laminar flow.

Elastic turbulence is a different physical phenomenon discovered at the end of the twentieth century. It has been observed at low flow speeds where Reynolds number is low and a Newtonian fluid would be in a state of laminar flow. Some early observations of elastic turbulence used the older term "elastic instability". However, that term is more general and includes other forms of instability in flow. Elastic turbulence occurs with fluids which are solutions containing dissolved molecules with one or more flexible long chains which can become entangled with other such molecules. The elastic turbulence is observed when the fluid flows with a sufficient speed along a flow path which causes the stream lines of flow to change direction. A number of documents have mentioned possible use of elastic turbulence in microfluidics, where dimensions of flow paths and rates of flow are so small that apparatus has a volume no greater than 10 ml and Reynolds number is vanishingly small, far below one.

SUMMARY

This summary is provided to introduce concepts that will be further elaborated and described below in the detailed description. This summary is not intended to identify key or essential features of the claimed subject matter, nor is it intended to be used as an aid in limiting the scope of the claimed subject matter.

An issue, which appears to have not been recognized before, concerns the flow of a fluid which contains dissolved polymers enabling the fluid to display elastic turbulence, when that flow is at a low speed and hence with low shear so that elastic turbulence is not occurring. This could, for instance, be when the fluid is pumped through piping on its way to the inlet of a device in which elastic turbulence is intended to occur. The strong elasticity of the dissolved polymers will not give rise to elastic turbulence in the piping but can give rise to some flow instabilities which increase the pressure drop and require use of a more powerful pump using more energy.

We have now discovered that elasticity at low shear can be reduced by using a mixture of polymers.

A first aspect of the present disclosure is a fluid composition able to exhibit elastic turbulence when flowing, which is a solution of two or more polymers, comprising: (i) at least one dissolved first polymer which is a flexible linear polymer having a weight average molecular weight of at least 10 MegaDaltons and (ii) at least one dissolved second polymer which is a flexible linear polymer having a weight average molecular weight in a range from 0.25 to 5 MegaDaltons, where the amount of higher molecular weight polymer is in a range from 0.05 to 5 wt % of the solution and is sufficient that a solution containing the first, higher molecular weight polymer without the second, lower molecular weight polymer can display elastic turbulence, and where the amount of the second polymer is greater than the amount of the first polymer but is not more than 10 wt % of the solution.

Including the second polymer of lower molecular weight has been found, as disclosed herein, to reduce overall elasticity under low shear conditions. It also affects temperature range at which elastic turbulence can occur.

Another aspect of this disclosure is a system comprising a fluid-containing structure defining a fluid flow path comprising a chamber with an inlet and outlet and with internal obstructions to compel stream lines of fluid flow to change direction, and tubing leading to the inlet of the chamber and from the outlet of the chamber wherein the system also comprises at least one pump for propelling fluid through the tubing and the chamber and wherein the structure contains a fluid composition in accordance with the first aspect above. The internal obstructions may be an array with regular spacing.

The fluid flow path may be a circuit. The tubing may carry fluid from a storage vessel to the inlet and may carry fluid from the outlet back to the same storage vessel or to another storage vessel.

A third aspect of this disclosure is a method of operating a system as above which comprises pumping the fluid through the tubing and chamber at a flow rate such that the fluid is in laminar flow without elastic turbulence in tubing leading to the chamber and is in a state of elastic turbulence within the chamber. Viscosity of fluid, the flow rate of the fluid within the chamber and the width of the gaps between internal obstructions may give a Reynolds number (Re) for the flow which is in a range from 1 to 1000.

One possibility for the above system and method is that the chamber may be part of a heat exchanger, where a wall of the chamber, in contact with fluid flowing through the chamber is an interface through which heat is conducted to or from the fluid flowing through the chamber and the elastic turbulence within the chamber enhances the rate of transport of heat energy into or out of the fluid flowing through the chamber.

Another possibility for the above system and method is that the chamber may be part of an electrochemical cell and the fluid contains at least one chemical species able to undergo an electrochemical reaction at an electrode of that cell. The chamber may be or may enclose a porous electrode, or an electrode may be in contact with the fluid flowing through the chamber. The elastic turbulence then enhances the transport of reactive species to a surface of the electrode. Alternatively or additionally, the elastic turbulence enhances transport of products of electrochemical reaction away from the electrode.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
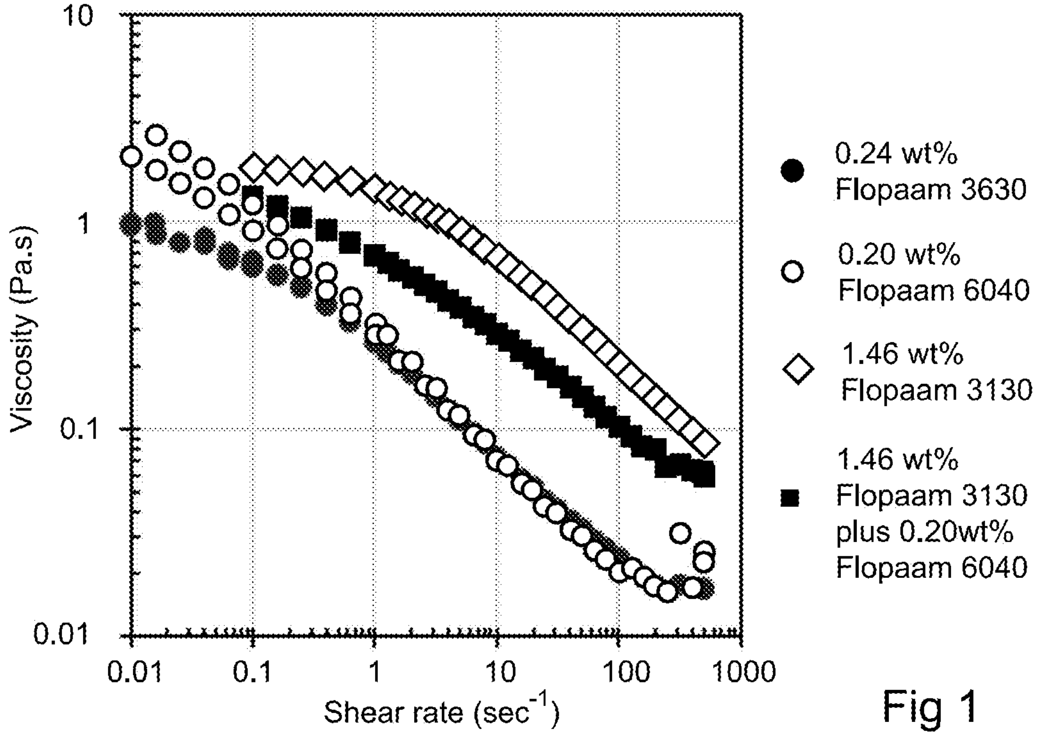
FIG. 1 is a plot of experimental results showing onset of elastic turbulence.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

This detailed description refers to embodiments of the present disclosure and possibilities which may be used. It should be appreciated that features or possibilities described in combination may, where it is practical to do so, be used individually. Also, features or possibilities described in any embodiment may be used in any other embodiment, in so far as it is possible to do so.

Compositions in accordance with this disclosure are solutions containing dissolved polymers in two categories defined by molecular weight and chain length. The first category is polymers of high molecular weight of at least 10 MegaDaltons (i.e. at least 10,000,000 gm/mole) containing at least one flexible linear chain. Such a chain may have a chain length of at least 5.000 monomer units which may be joined one to the next by a single chemical bond. A single chemical bond allows rotation at the bond whereas a double bond will not. The polymer or polymers in this category enable elastic turbulence to occur. Polymers in this first category may contain at least one linear chain with a length at least 20,000 monomer residues joined by single chemical bonds and the chain length may be considerably greater such as at least 50,000 or at least 100,000 monomer residues. Polymers in this first category may include a single linear chain of 250,000 or more monomer units although some chain branching to connect long linear chains is also possible. The weight average molecular weight of polymers in this first category may be at least 15 MegaDaltons or at least 16 or 17 MegaDaltons. It may possibly be even higher such as at least 23 MegaDaltons. The concentration of such high molecular weight polymer included in a solution may be not more than 5% by weight, for instance in a range from 0.05% or 0.1% up to 1% or 2% by weight.

Polymers in the second category also contain at least one flexible linear chain. These polymers have a lower molecular weight, such that weight average mean molecular weight is in a range from 0.25 MegaDaltons up to 5 MegaDaltons. In some embodiments the polymers in this category have a molecular weight of at least 0.5 MegaDaltons or at least 1 MegaDalton. A polymer in this category may contain at least one linear chain of at least 2000 monomer residues, which may be connected by single chemical bonds. The length of a single linear chain in a polymer of this category may be considerably greater than 2000 or 5000 monomer units while complying with the requirement for a mean molecular weight not greater than 5 MegaDaltons.

Polymers in this second category should be present in a concentration which is greater than the concentration of polymers in the first category. The concentration of polymer or polymers in the second category may be not more than 10 wt % and may be not more than 7 wt % or 5 wt % of the fluid. The concentration of polymer or polymers in the second category may be at least double the concentration of polymers in the first category and may be at least 3 or at least 4 times the concentration of polymers in the first category.

Polymers in both the above categories contain linear chains of monomer units. These monomer units may be joined one to the next by a single chemical bond so as to allow rotation. A polymer chain may be a homopolymer from a single monomer or the chain may be a copolymer of more than one monomer, for instance a block copolymer which is linear. The polymers may also include side chains attached to a long chain of monomer units which are connected together by single covalent bonds. If a chain contains units which are themselves an oligomer, as in a block copolymer for instance, the oligomeric units may rotate relative to one another more freely than monomer residues within an oligomeric unit. A polymer may include some chain branching, for instance at branch points where three or more linear chains, each of at least 1000, and possibly at least 2000 or 5000 monomer units, are connected together.

The flexibility of the polymer chains enables the polymer molecules to become entangled. The flexibility of polymer chains can be described by means of a mathematical model. The freely jointed chain model is commonly used and the flexibility of a particular polymer can be indicated by parameters of an equivalent freely jointed chain (itself a mathematical model). A description of this approach is provided by Chapter 2 of "Polymer Physics" by Rubinstein and Colby, 2003, Oxford University Press. An equivalent freely jointed chain has the same mean-square end-to-end distance and the same maximum end-to-end distance as the actual polymer but is considered to include so-called Kuhn monomers which are freely rotatable relative to each other. These model monomers have a length, termed the Kuhn length, and a molar mass.

Polymers in the first category above may contain at least one flexible polymer chain with length and composition corresponding to at least 5000 Kuhn monomers having a Kuhn length not more than 100 Angstroms (10 nm) and possibly not more than 50 Angstroms. If a polymer in the first category is a single, unbranched chain, its length may correspond to at least 20,000 Kuhn monomers and possibly at least 50,000 Kuhn monomers.

Polymers in the second category above may have a length and composition corresponding to at least 100 Kuhn monomers, possibly at least 250 or at least 500 Kuhn monomers, also with a Kuhn length not more than 100 Angstroms and possibly not more than 50 Angstroms.

Elastic turbulence has been observed with several different long chain polymers in solution. One such polymer is polyacrylamide, which may be hydrolyzed or partially hydrolyzed. Experimental evidence for elastic turbulence in a solution of high molecular weight polyacrylamide was given by Groisman and Steinberg in "Elastic Turbulence in a polymer solution flow" Nature, Vol 45 p53 (2000). Other instances of long chain polymers reported to give rise to elastic turbulence include polyisobutylene of molecular weight 4 to 6 MegaDaltons dissolved in an organic solvent (Dris and Shaqfeh, J. Non-Newtonian Fluid Mech. Vol 80 pages 1 to 58 (1998)), polystyrene of molecular weight 18 MegaDaltons in an organic solvent (Magda and Larson, J. Non-Newtonian Fluid Mech. Vol 30 pages 1-19 (1988)) and polyethylene oxide of molecular weight 4 MegaDaltons in an aqueous solution (Davoodi et al, J. Fluid Mech. Vol 857, pages 823-850 (2018)). Kuhn lengths for polystyrene and polyethylene oxide given by Rubinstein and Colby, page 53 are 18 Angstroms and 11 Angstroms. Kuhn length for polyacrylamides has been reported as 15 to 25 Angstroms (Fetters, Lohse and Colby, Chain Dimensions and Entanglement Spacings. In Physical Properties of Polymers Handbook; Mark, J. E., Ed.; Springer:NewYork, 2007; pages 447-454).

The first category of polymers may be a single polymer or a mixture of polymers. Likewise, the second category may be a single polymer or a mixture. The polymers in the two categories may be polymers of the same monomer and differing only in length, or may be polymers of different monomers. For instance, the first category may be partially hydrolyzed polyacrylamide while the second category is polyethylene glycol.

When using long chain polymers to enable elastic turbulence to occur, it is desirable to include a biocide to protect the polymers from biodegradation.

When a solution contains a substance able to cause elastic turbulence, the phenomenon of elastic turbulence occurs if the solution is flowing at a sufficient flow velocity (which may be a low velocity) and the path of flow causes the streamlines of the flow to curve. Consequently, one known possibility for a flow path which induces elastic turbulence is a serpentine channel. Another possibility is described below with reference to the drawings. A detailed discussion of elastic turbulence is provided by Steinberg in Annual Review of Fluid Mechanics, vol 53, pages 27-58 (2021).

A composition containing polymers in both categories, in accordance with this disclosure, and a composition without the polymer or polymers in the second category may exhibit elastic turbulence under similar flow conditions. At lower shear, where there is no elastic turbulence, the polymer or polymers in the first category will increase the viscosity of the composition. Including polymer or polymers of the lower molecular weight second category in accordance with this disclosure has been found to reduce the viscosity at low shear.

The ability of a solution to display elastic turbulence can be shown experimentally. In a cone and plate rheometer cell, the onset of elastic instability with application of increasing shear is observed as an apparent increase in viscosity at a particular shear rate associated with an abrupt increase in the noise in the measured torque signal. This has been described by D. O. Olagunju, "Instabilities and bifurcations of von Karman similarity solutions in swirling viscoelastic flow", Z Angew Math Phys, 46 (1995) 224-238 and also by E. Tran, A. Clarke, "The relaxation time of entangled HPAM solutions in flow", Journal of Non-Newtonian Fluid Mechanics, 311 (2023) 104954). The apparent increase in viscosity can be seen as a change in the slope (sometimes referred to as an uptick) in the plot of viscosity against shear rate. FIG. 1 shows results from experimental tests carried out with a laboratory rheometer operated to take measurements at increasing steps of shear rate and then at decreasing steps of shear rate. It is a plot of dynamic viscosity against increasing shear rate for four aqueous solutions all containing 0.456 wt % sodium chloride, a small percentage of linear partially hydrolyzed polyacrylamide and a few drops of a biocide consisting of isopropanol and thiourea. The polyacrylamides in the solutions were:

a) (filled circles) 0.24 wt % of Flopaam 3630, which is 30% hydrolyzed polyacrylamide with a mean molecular weight between 18 and 20 MegaDaltons
b) (open circles) 0.2 wt % of Flopaam 6040, which is 40% hydrolyzed polyacrylamide with a mean molecular weight between 25 and 30 MegaDaltons
c) (open diamonds) 1.24 wt % of Flopaam 3130, which is 30% hydrolyzed polyacrylamide with a mean molecular weight of 3.6 MegaDaltons
d) (filled squares) 1.24 wt % of Flopaam 3130 together with 0.2 wt % of Flopaam 6040.

These Flopaam partially hydrolyzed polyacrylamides are available from SNF Floerger whose headquarters are in Andriézieux, France.

The polymers used in both solutions (a) and (b) meet the requirements for the first category, stated above. With both solutions (a) and (b) the onset of elastic turbulence with increasing shear rate can be seen as the change in slope of the plotted curve at about 150 $s^{-1}$. The polymer used in solution (c) met the requirements for the second category above. Elastic turbulence was not seen within the range of shear rate tested, although it is possible to induce elastic turbulence with this polymer at even higher shear rates beyond the capability of the rheometer used here. Solution (d) contained a mixture of polymers meeting the requirements of this disclosure. The onset of elastic turbulence for solution (d) occurred at shear rate of similar magnitude to the shear rates for solutions (a) and (b). Thus at the higher shear rates required at the onset of elastic turbulence, the elastic properties are dominated by the polymer in the first, higher molecular weight, category.

Characteristic times indicative of the time for relaxation of the elastic polymer or polymer mixture can be derived by fitting the measured values to a model, such as the Carreau-Yasuda model which is a mathematical equation linking a number of parameters. Tools for fitting of data to equations are available in both general and specialist software (e.g.

Figure 2:
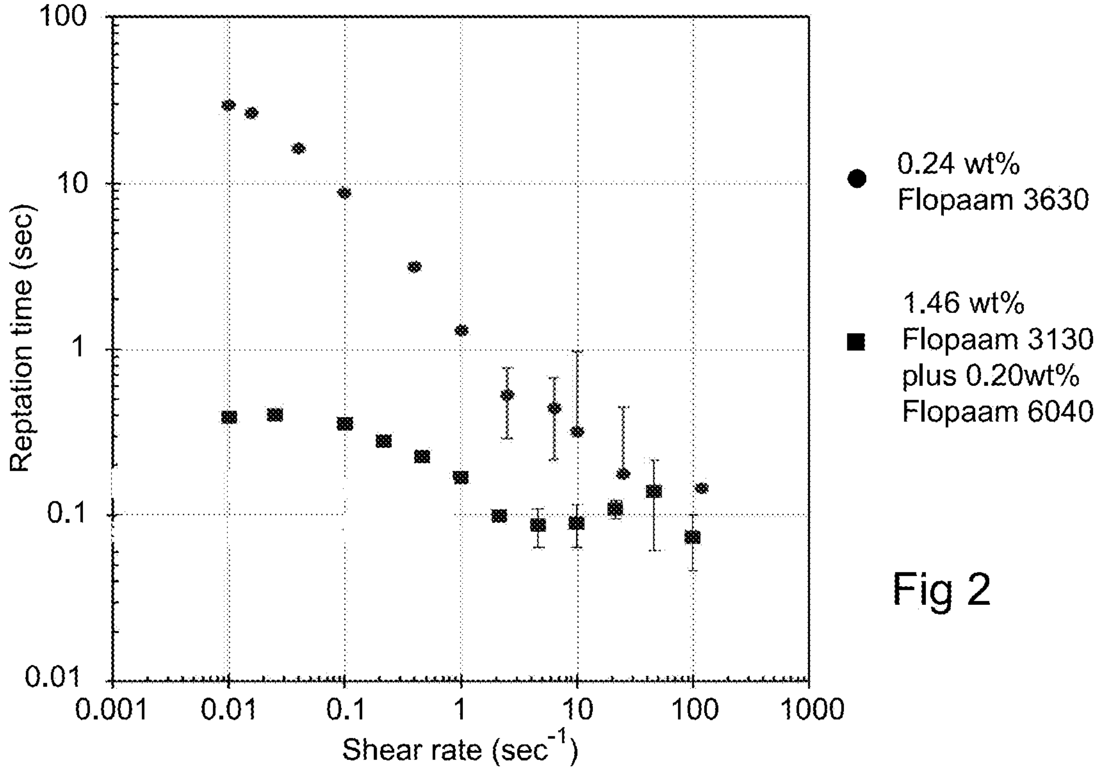
FIG. 2 is a plot of reptation times against shear rates.

Matlab, Excel and Python). FIG. 2 is a plot of reptation times at shear rates below the onset of elastic turbulence for solution (a) containing Flopaam 3630 and for solution (d) containing the mixture of Flopaam 6040 and Flopaam 3130. Reptation time is a characteristic time indicative of relaxation under low shear. At the lowest shear rate of 0.01 $sec^{-1}$ the reptation time for solution (a) was 9.5 sec whereas the reptation time for solution (d) was only 0.2 sec. Also, the reptation time for solution (b) was found to be 28.5 sec at the shear rate of 0.01 $sec^{-1}$. Thus at low shear the elastic properties of the solution can be dominated by the less elastic polymer in the second category.

These findings show that a solution containing a mixture of polymers in accordance with this disclosure will give rise to elastic turbulence under similar flow speed and shear conditions as would be required for polymer in the first category without any polymer in the second, lower molecular weight category being present, but under low shear conditions the mixture of polymers will display lesser elastic properties, thereby mitigating elastic instabilities and pressure drop when flowing at low shear.

Another effect of including polymer in the second category is a change in the effect of temperature on the onset of elastic turbulence. With fluid (a) containing Flopaam 3630 the onset of elastic turbulence moves to slightly higher shear rate as temperature is increased. With fluid (d) containing a mixture of polymers in the two categories the movement of the onset of elastic turbulence to higher shear rate with increasing temperature was more pronounced.

Compositions in accordance with this disclosure may be used in a variety of systems where a fluid is pumped into and through a chamber in which the fluid displays elastic turbulence. The reduced elastic properties under low shear conditions can reduce the pressure drop as the fluid is pumped along piping, tubing or any other form of flow path to the inlet to the chamber and also as the fluid is pumped along piping, tubing or other flow path away from the chamber outlet.

FIGS. 3 to 7 illustrate this use of a fluid containing a mixture of polymers when the fluid is the working fluid of a heat transfer circuit and walls of chambers in which there is elastic turbulence are interfaces through which heat energy is transferred into or from that working fluid.

FIGS. 8 to 12 illustrate this use of a fluid containing a mixture of polymers in electrochemical half-cells in which the fluid is an electrolyte pumped through a half-cell and elastic turbulence is made to occur in contact with an electrode.

Figure 3:
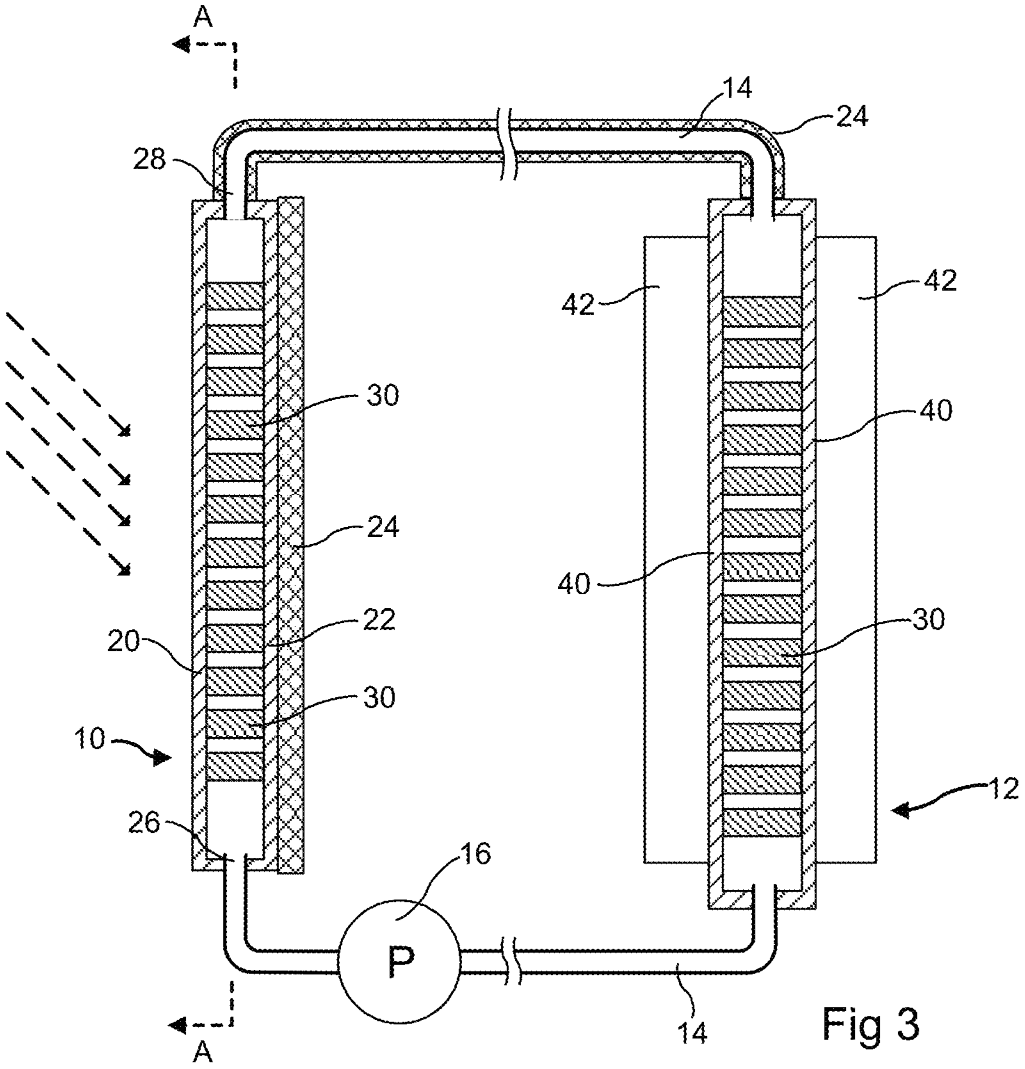
FIG. 3 is a diagrammatic view of a heat transfer system with two devices for heat transfer, both of which are shown as cross sections.

As an example embodiment of this disclosure. FIG. 3 shows a heat transfer system for transferring heat energy from a heat source to a volume of water. The device 10 at the left of FIG. 3 is exposed so as to be heated by the sun. The device 12 at the right of FIG. 1 is immersed in a body of water. The two devices 10, 12 are joined by piping 14 for circulating working fluid which is pumped around the circuit by pump 16. The section of piping which carries hot working fluid is surrounded by heat insulation 24. The devices 10 and 12, along with piping 14 and pump 16 form a heat exchange circuit for transferring solar heat energy received at the surface 20 of device 10 to the water surrounding the device 12.

The device 10 has a cuboidal casing defining a chamber through which the working fluid is pumped. The casing face 20 which is exposed to the heat of the sun is the interface between the working fluid inside the casing and the source of heat. This is made of a thermally conductive material, such as copper or aluminum. The opposite surface 22 has heat insulation 24 against it to reduce heat loss.

Figure 4:
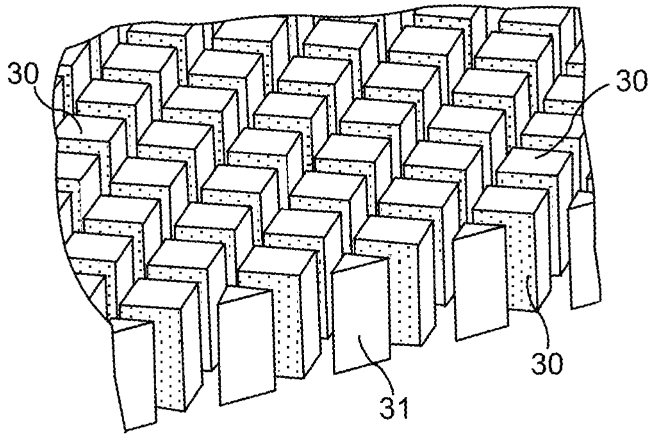
FIG. 4 shows part of an array of pillars as in the heat transfer devices of FIG. 3.
Figure 5:
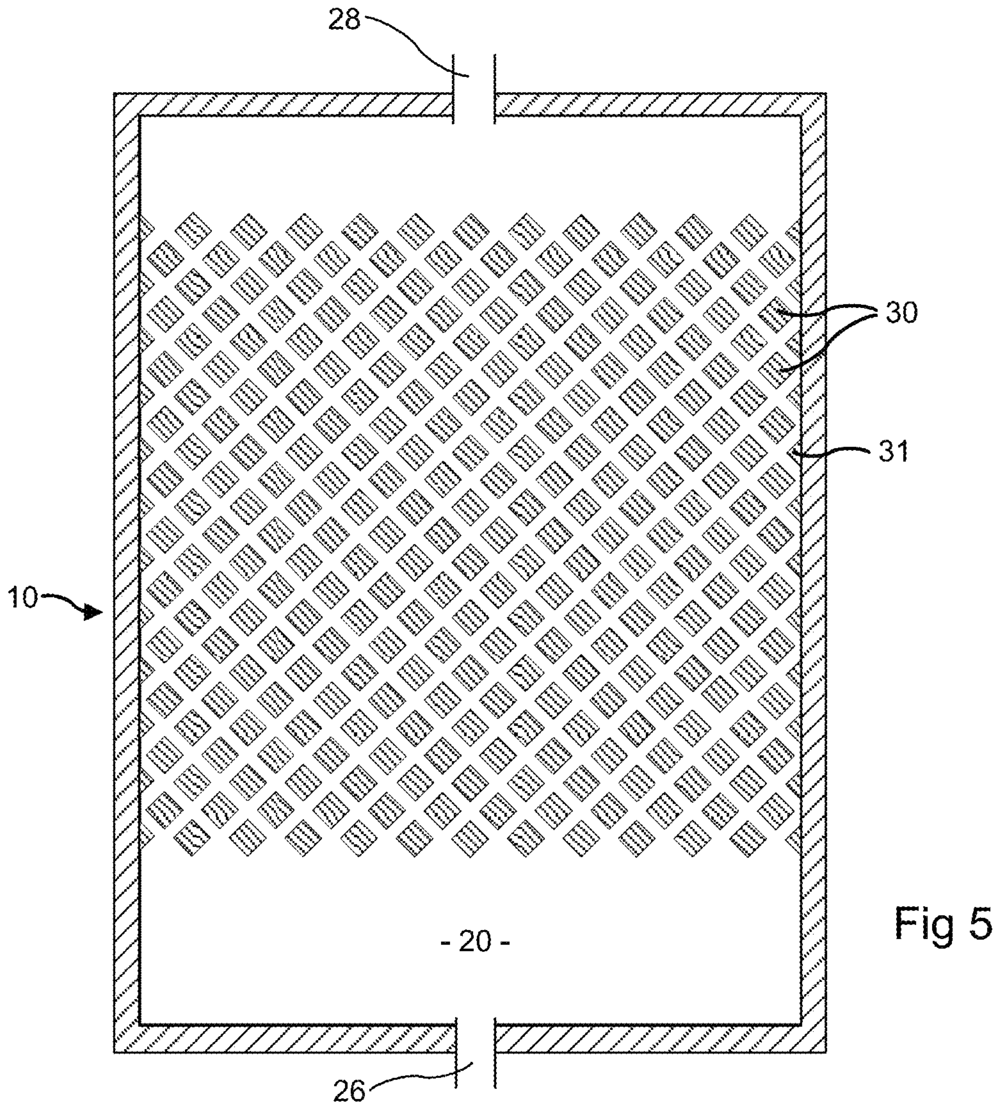
FIG. 5 is a cross section of one heat transfer device, on line A-A of FIG. 3.

Inside the casing of the device 10 is an array of pillars 30 formed by bars which extend from the casing face 20 across the internal chamber to the opposite face 24. FIG. 4 illustrates the arrangement of such pillars 30 as a perspective view from one side, without the enclosing casing 20. FIG. 5 which is a cross section on line A-A of FIG. 3 also shows the arrangement of the pillars 30. As shown by FIG. 5 and the enlargement which is FIG. 6 the pillars 30 have a square cross section with flat faces 32 meeting at corner edges 33 and 34. The width of a flat face 32 is indicated as "a" in FIG. 6 and the spacing between the faces 32 of adjacent pillars is indicated as "b". The width of the gap between two confronting edges 34 is given by Pythagoras theorem as $\sqrt{2b^2}$. As shown in FIG. 4, the side edges of the array are completed with pillars 31 which have a triangular cross section. Each pillar 30 is positioned so that the diagonal across the square cross section between corner edges 33 is aligned with the overall direction of flow, i.e. this diagonal is aligned parallel to an imaginary line from the inlet 26 to the outlet 28. The flat faces 32 of each pillar are inclined to this overall direction of flow. As shown by the enlarged view in FIG. 6, working fluid flows through the gaps between confronting edges 34 of adjacent pillars 30, but is then compelled to turn by another pillar. Thus the array of pillars 30 obstructs straight line flow of working fluid, causing the streamlines of the flow indicated with broken lines in FIG. 6 to bend repeatedly.

The heat exchange device 12, which is immersed in water to be heated, has a cuboidal casing 40 which is the interface through which heat energy leaves the working fluid. Fins 42 projecting from the casing 40 assist the conduction of heat from the casing 40 to the surrounding water.

The interior of the device 12 is similar to the interior of the device 10. The casing 40 defines a chamber for the through flow of working fluid. Bars which extend across the interior chamber from one side face to the other have a square cross section and provide an array of pillars 30 obstructing flow just as described for the device 10.

Figure 7:
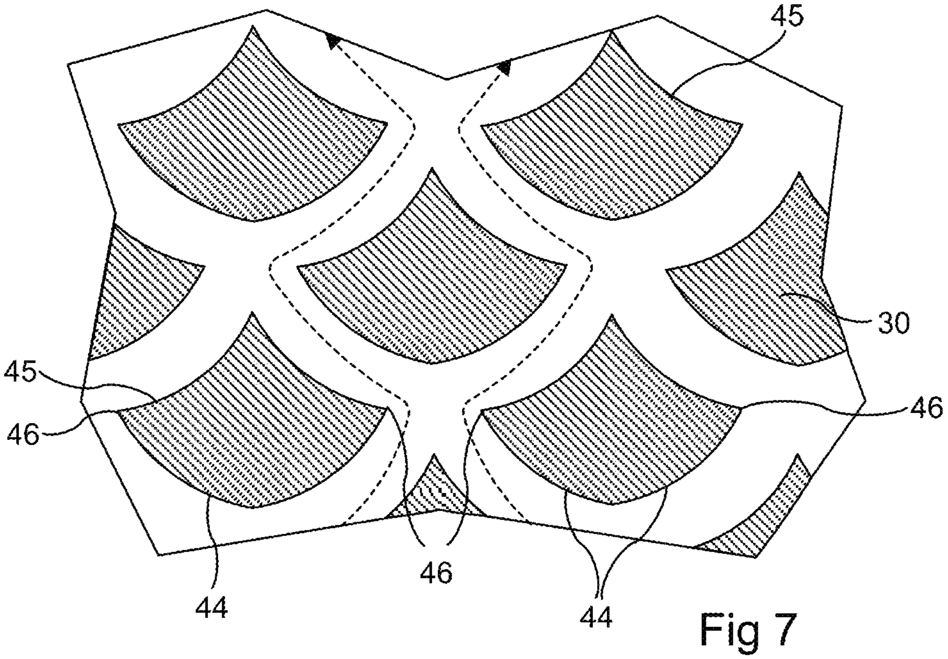
FIG. 7 is a similar view to FIG. 6, showing pillars with a different cross section.

FIG. 7 shows another possible cross section for pillars 30. The surfaces 44 have convex curvature and intersect concave surfaces 45 at edges 46. Fluid flows through the gaps between edges 46 as shown by the broken lines and is compelled by the arrangement of pillars to change direction as it does so.

The working fluid circulated through the heat transfer devices 10 and 12 is an aqueous solution of polymer in the first category set out above plus polymer in the second category above. The working fluid also contains a small concentration of a biocide to prevent biological degradation of this polymer.

The circulating pump 16 propels the working fluid such that fluid entering the device 10 at its inlet 26 is in a state of laminar flow. Flow entering the device 12 is also laminar. This flow rate is such that when the working fluid flows through the arrays of pillars within the devices 10 and 12 it is in a state of elastic turbulence. In the device 10 this has the effect of transferring heat energy from the casing surface 20 to the working fluid more rapidly than would be transmitted by conduction under conditions of laminar flow without elastic turbulence. Similarly, in the device 12, elastic turbulence increases the rate of transfer of heat from the working fluid to the casing 40 of the device 12, from which the heat energy passes on to the fins 42 and to the water surrounding the device 12.

The piping 14 connecting the devices 10, 12 to each other and to the pump 11 carry the same flow rate (in volume per unit time) as passes through the devices 10, 12. This piping 14 is designed with sufficiently large dimensions that the flow speed within it is low so that, as well as being in a state of laminar flow, the fluid flowing in the piping is subjected to low shear. Consequently, the reptation time of the fluid is small, to avoid elastic instabilities within the fluid causing an increase in pressure drop along this piping 14.

FIGS. 8 to 13 show systems where the fluid which displays elastic turbulence is pumped through an electrochemical half-cell. Flowing electrochemical cells are used in various categories of equipment. One of these is a flow battery which normally includes two half-cells separated by a membrane which separates the fluids of the two half-cells but which allows passage of ions which are required to cross from one half-cell to the other. During charge and discharge, in each half-cell, a fluid containing one or more species which undergo electrochemical reaction is pumped through the half-cell from an associated storage vessel and after passing through the half-cell, is either discharged to another storage vessel or circulated back to the vessel it came from. Flow batteries have the characteristic that the storage capacity for electrical energy is not determined by the size of the electrochemical cell but by the amount of fluid which is held in the storage vessels.

Figure 8:
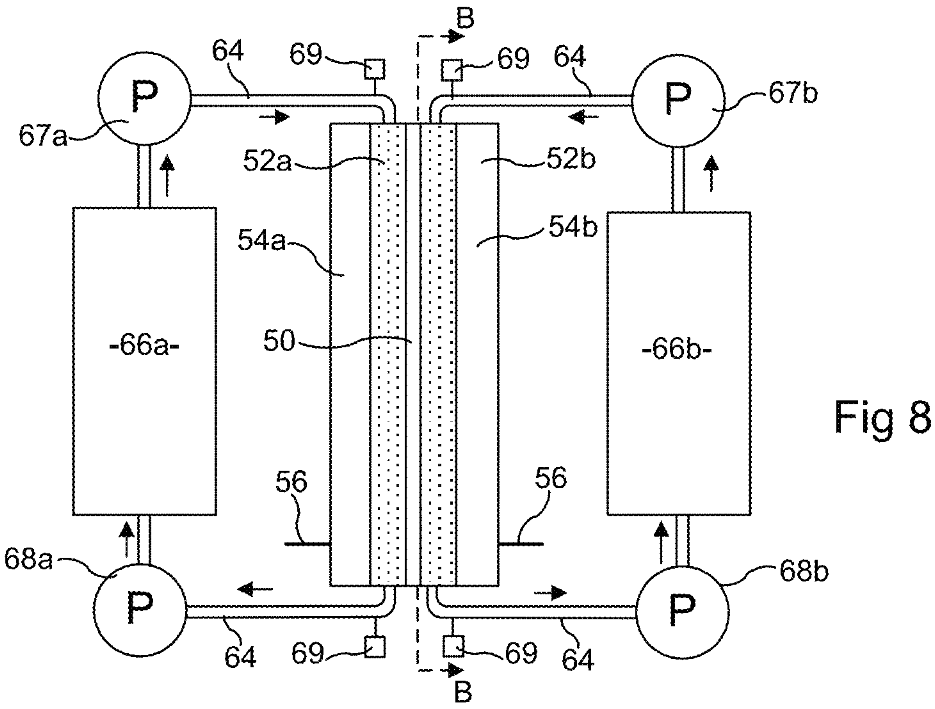
FIG. 8 is a schematic diagram showing component parts of a flow battery.
Figure 9:
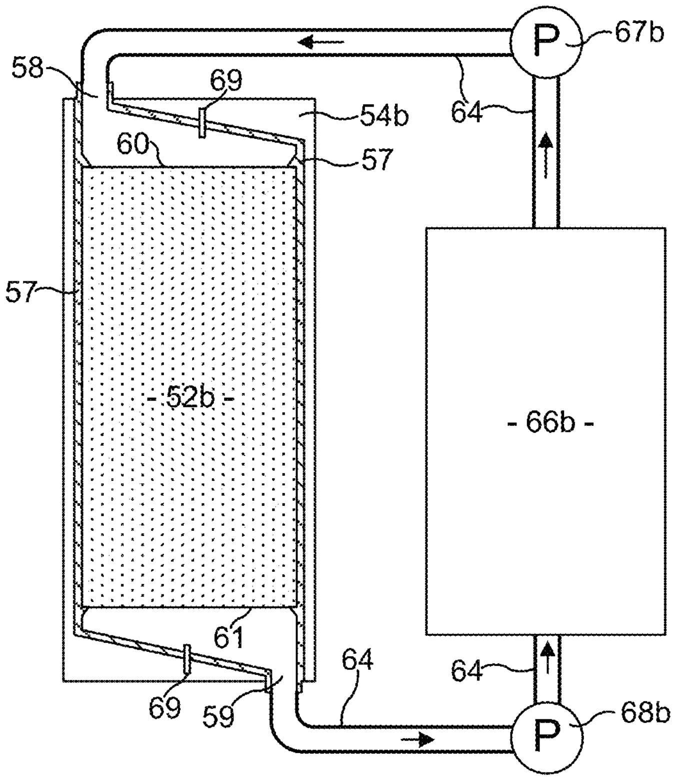
FIG. 9 is a view on the line B-B of FIG. 8 showing the path for circulation of electrolyte fluid through a flow-through porous electrode.

FIGS. 8 and 9 show a flow battery with a central membrane 50, which separates two half-cells, and is shown with exaggerated thickness in FIG. 8. Shown to the left of the membrane 50 is a half-cell formed by a porous carbon electrode 52*a* which is held in contact with the membrane 50 by a rigid plate 54*a* made of conductive material, such as graphite or a metal. Shown to the right of the membrane 50 is another half-cell formed by a porous electrode 52*b* held in contact with the membrane 50 by electrically conductive rigid plate 54*b*. The porous electrodes 52*a* and 52*b* may be identical. The plates 54*a* and 54*b* may also be identical to each other. Each electrode 52 is made from a fibrous material which has been carbonized, so that it contains numerous carbon strands packed together and has high surface area. The membrane 50, the electrodes 52 and the plates are enclosed by a casing, not shown. Electrical connection to the electrodes 52 is provided by the conductive plates 54 which are themselves connected to electric cables 56.

As shown by FIG. 9, the electrode 52*b* is surrounded by a frame 57 which has a fluid inlet and a fluid outlet. In this view the plate 54*b* is behind the electrode 52*b* and frame 57. The plate 54*b* projects slightly beyond the frame 57, as shown and the frame is sealed to the plate 54*b*. The electrode 52*a* is surrounded by a similar frame.

The inlet 58 and outlet 59 of the frame 57 are connected by piping 64 to a storage tank 66*b* of an electrolyte fluid which is circulated through the electrode 52*b* by pumps 67*b*, 68*b* during charge and during discharge. Similarly, the frame around the porous electrode 52*a* is connected by piping to a storage tank 66*a* of an electrolyte fluid which is circulated through the electrode 52*a* by pumps 67*a*, 68*a*. It is desirable to construct the piping 64 without sharp bends or other features which can cause a pressure drop. Fluid pumped to the inlet 58 enters the porous electrode 52*b* through its end 60 and flows through the electrode 52*b* to its opposite end 61 from where it continues to the outlet 59 and then onwards through piping 64 to pump 68*b* and the storage tank 66*b*. Flow from tank 66*a* passes through porous electrode 52*a* in similar manner.

In accordance with this disclosure, the electrolyte fluids flowing through each of the half-cells include an aqueous solution of polymer in the first category set out above and polymer in the second category above. The working fluid also contains a small concentration of a biocide to prevent biological degradation of this polymer. Pumping power is such that flow arriving at the ends 60 of the porous electrodes is laminar. When the flow enters an electrode the mesh of carbonized fibers which form that porous electrode will cause the streamlines of the flow to change direction many times and thereby create elastic turbulence which will mix the electrolyte as it flows, transport the electrochemically active species into contact with the surfaces of carbon in the porous electrode and transport the products of reaction away from the carbon surfaces. The increased transport of chemical species as a result of elastic turbulence will increase the maximum current flow in the half-cell, compared with a half-cell of the same construction but without the first category polymer in the electrolyte fluid.

Pressure sensors 69 are fitted near to the ends 60 and 61 of the porous electrodes. These allow measurement of the pressure drop between inlet and outlet of an electrode. This measurement of pressure drop can be used to detect the onset of elastic turbulence by pumping fluid at progressively increasing flow rates until there is a sudden increase in the pressure drop at the onset of elastic turbulence.

A very considerable number of compounds able to undergo electrochemical redox reaction have been suggested for use in flow batteries and this is still a subject of research. A number of these compounds have been reported to be usable under mild conditions with neutral or near-neutral pH. By way of example, a possibility for the fluid at a positive electrode is an aqueous solution of iodine and an iodide which can reversibly form tri-iodide ions in the reaction:

$$I_2 + I^- + 2e^- \rightleftharpoons I_3^-$$

A possibility for the fluid at the negative electrode is an aqueous solution of 2,6-dihydroanthroquinone which can undergo electrochemical reduction to the corresponding hydroquinone. Also, derivatives of 2,6-anthroquinone obtained by reaction at the hydroxyl groups have been suggested in a number of articles including Kerr et al, ACS Energy Letters vol 8 pages 600-607 (203) and Jin et al ACS Energy Letters vol 4 pages 1342-48 (2019).

Further possibilities for electrochemically reactive species are other quinones, ferrocenes and bipyridyl compounds. The latter are also known as viologens. DeBruler et al in ACS Energy Letters vol 3 pages 663-668 (2018) have described an experimental flow battery in which one half-cell contained 1,1'-bis[2-sulfonatopropyl]-4,4'-bipyridinium and the other half-cell contained iodine and iodide as above. The separating membrane was a cation exchange membrane. Another experimental flow battery for the electrochemistry using an anion exchange separating membrane, a substituted viologen in one half-cell and a substituted ferrocene in the other has been described by Lv et al in ACS Energy Letters vol 7 pages 2428-2434 (2022).

Figure 11:
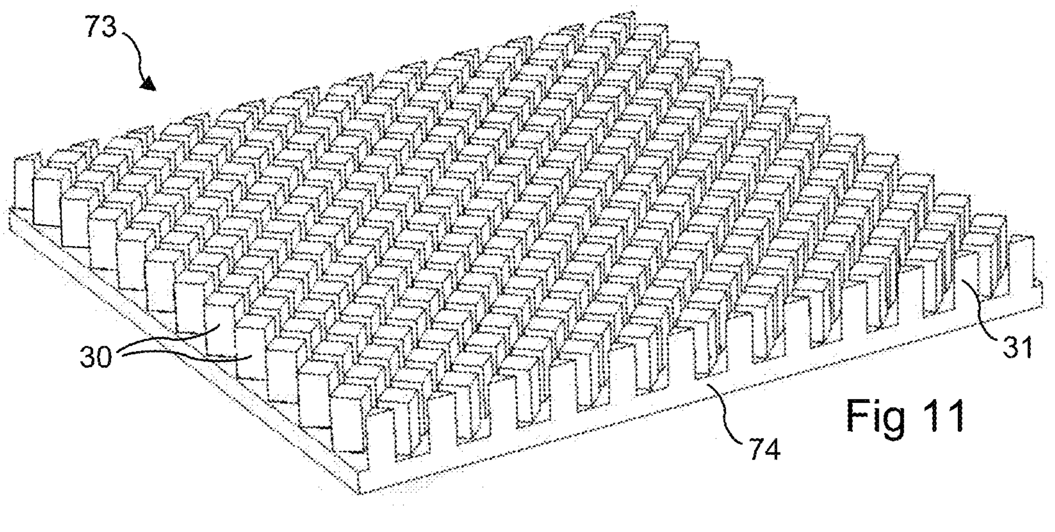
FIG. 11 is a perspective view of a flow guide used in the battery of FIG. 10.
Figure 10:
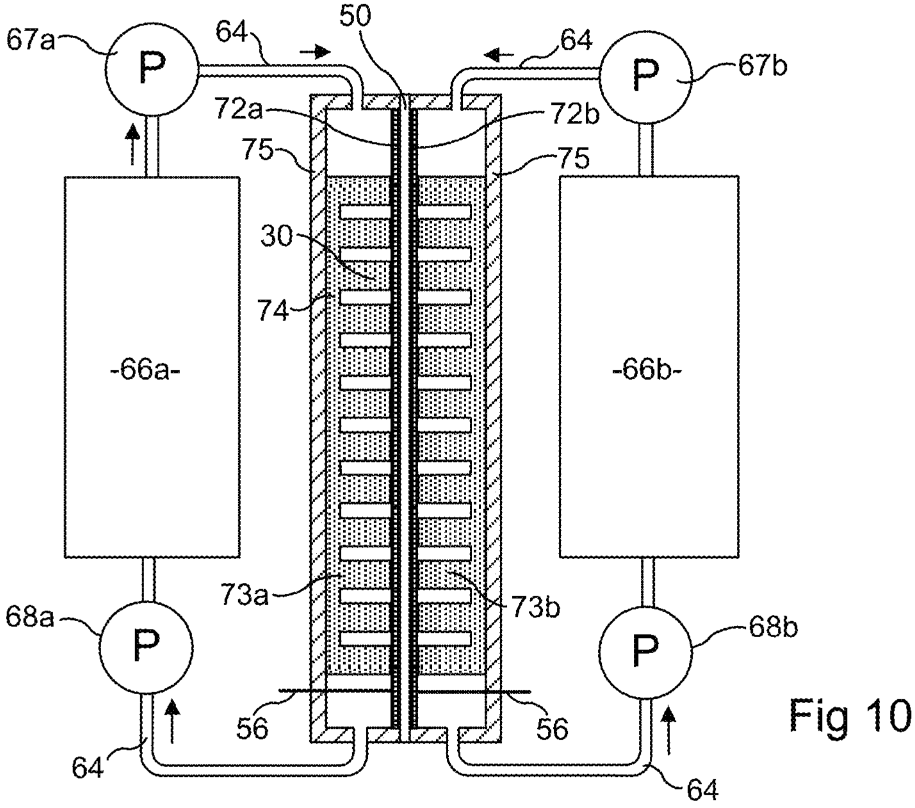
FIG. 10 is a diagram showing component parts of another flow battery.

FIGS. 10 and 11 show a flow battery which is different in construction to that of FIGS. 8 and 9. The battery again has two half-cells separated by a membrane 50. Each half-cell has a thin porous electrode next to the membrane 50 and a flow guide which is directly adjacent to this electrode and is held in position by a casing 75 of the flow battery. The flow guide is an array of square cross section pillars 30 integral with a planar base 74. The pillars are arranged in a regular array as shown. For each half-cell the structure defines a chamber between the casing and the electrode for through flow of fluid and the pillars 30 of the flow guide are obstructions in the chamber which cause elastic turbulence to occur.

Electrolyte fluids from tanks 66*a* and 66*b* are pumped through the half-cells by pumps 67*a*, 67*b* and then returned to the same tanks by the pumps 68*a* and 68*b*. As with the system shown by FIGS. 8 and 9 the electrolyte fluids contain long chain linear polymers in the first category set out above and in the second category above. The polymer in the first category enables elastic turbulence to occur as the fluid flows through the flow guide, as described above with reference to FIGS. 4 to 6. This elastic turbulence leads to a pressure drop as the electrolyte fluids pass through the flow guide and this pressure drop induces fluid to flow into the thin porous electrodes. These porous electrodes may have a fibrous structure causing the flow within them to make changes of direction, thereby causing the elastic turbulence to continue within them. Also even if these electrodes did not compel fluid within them to make changes of direction, the elastic turbulence initiated within the flow guides would persist for some distance into the thin porous electrodes.

In the arrangement shown by FIG. 10 the flow guides may be made of graphite or another conductive material in order to conduct electricity from or to the thin electrodes. However, if the thin electrodes have sufficient electrical conductivity, they could be connected to cables 56 as shown and the flow guides could be made of an electrically insulating material. They could be made by an additive manufacturing process such as 3D printing.

Figure 12:
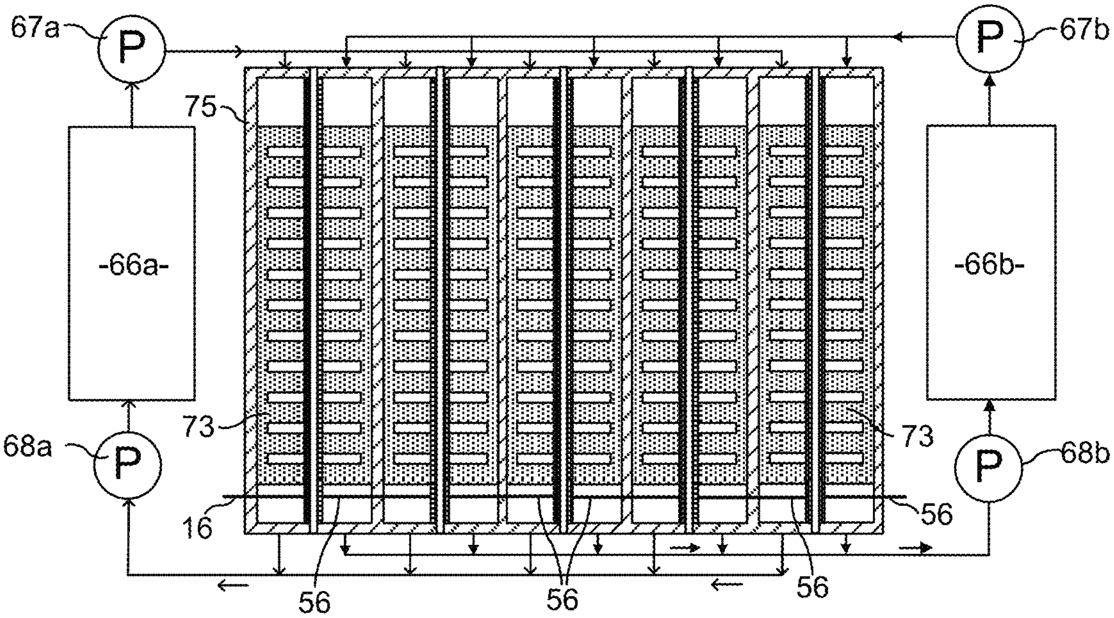
FIG. 12 shows five of the flow batteries of FIG. 10 connected as a stack.

FIG. 12 shows five of the electrochemical cells of FIG. 10 arranged side by side in a so-called stack. The cells are shown connected electrically in series by cable 56, although connection in parallel is also possible. The tank 66*a* and pump 67*a* are connected to pump an electrolyte fluid into the left hand half of each cell. Likewise, the tank 66*b* and pump 67*b* are connected to pump the other electrolyte fluid through the right hand half of each cell in the stack. (In FIG. 12 the piping is shown diagrammatically by single lines.)

Figure 13:
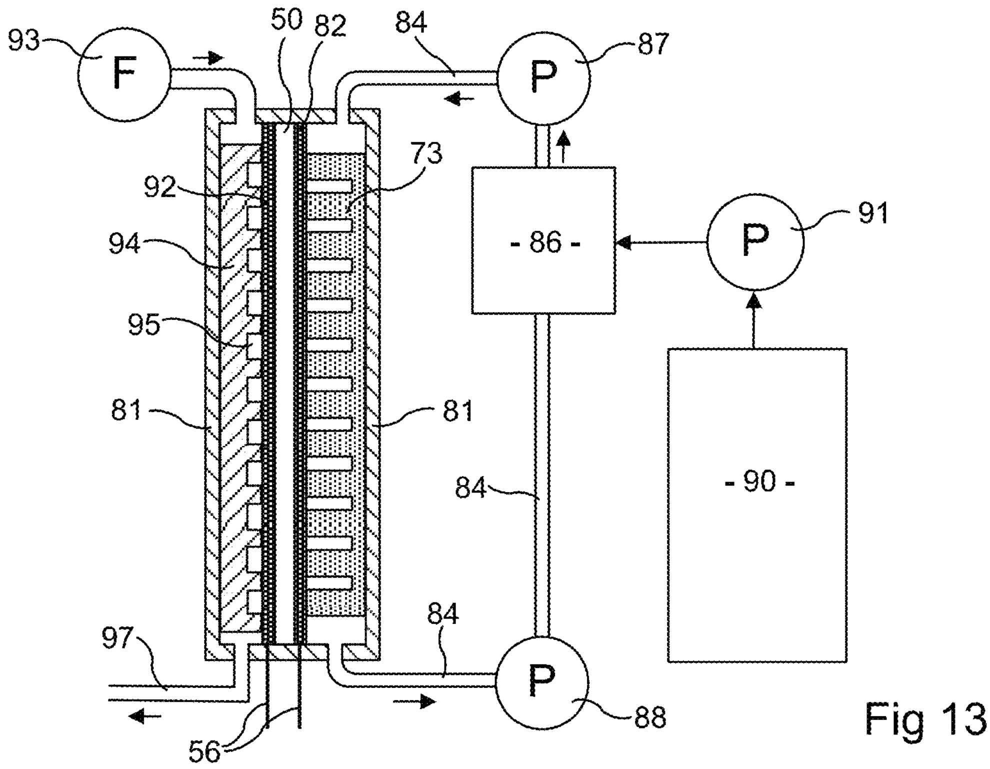
FIG. 13 is a diagram showing component parts of a fuel cell.

FIG. 13 shows a further embodiment of this disclosure which is a fuel cell using methanol as fuel. It has a membrane 50 separating two half-cells within a casing 81. At one side, to the right as seen in FIG. 13, a thin porous electrode 82 is adjacent to the membrane 50. A flow guide 73, as described above, is next to this porous electrode 82. The electrode 82 incorporates a catalyst for the electrochemical reaction of methanol. Electrical connections for the generated electricity are indicated at 56.

Electrolyte fluid which is an aqueous solution of methanol containing a mixture of polymers in the above mentioned first and second categories is drawn from mixing tank 86 by pump 87 and pumped through piping 84 into the half-cell and thus to the flow guide 73. Within the flow guide, the flow around the pillars causes elastic turbulence, as described with reference to FIGS. 4 to 6 and this increases the transport of methanol to the thin catalytic electrode 82. The electrolyte fluid, with a depleted concentration of methanol flows out of the electrode 82 and flow guide 73 and is returned to the mixing tank 86 by pump 88. Additional methanol is drawn from fuel tank 90 and delivered to the mixing tank 86 by pump 91 to maintain a steady concentration of methanol in the mixing tank and so in the fluid entering the flow guide 73.

In the half-cell to the left, atmospheric oxygen combines with hydrogen ions which pass through the membrane 50. A thin porous electrode 92 next to the membrane 50 incorporates a catalyst for this electrochemical reaction. A fan 93 blows air into a plate 94, which has a system of channels 95 cut into it and gives a distributed flow of air to the catalytic electrode 92. Wet air with a depleted oxygen content leaves as exhaust.

In all the systems with electrochemical half-cells shown in FIGS. 8 to 12, the polymer in the first category, with higher mean molecular weight, enables the electrolyte fluid to display elastic turbulence as it flows through the half-cells, but the piping 64, 84 leading to and from the half-cells is dimensioned so that flow in the piping is at low shear. The polymer in the second category reduces elastic instability in the flow through this piping and hence avoids a need for excess pumping power which is wastefully consumed by overcoming such elastic instabilities.

Figure 14:
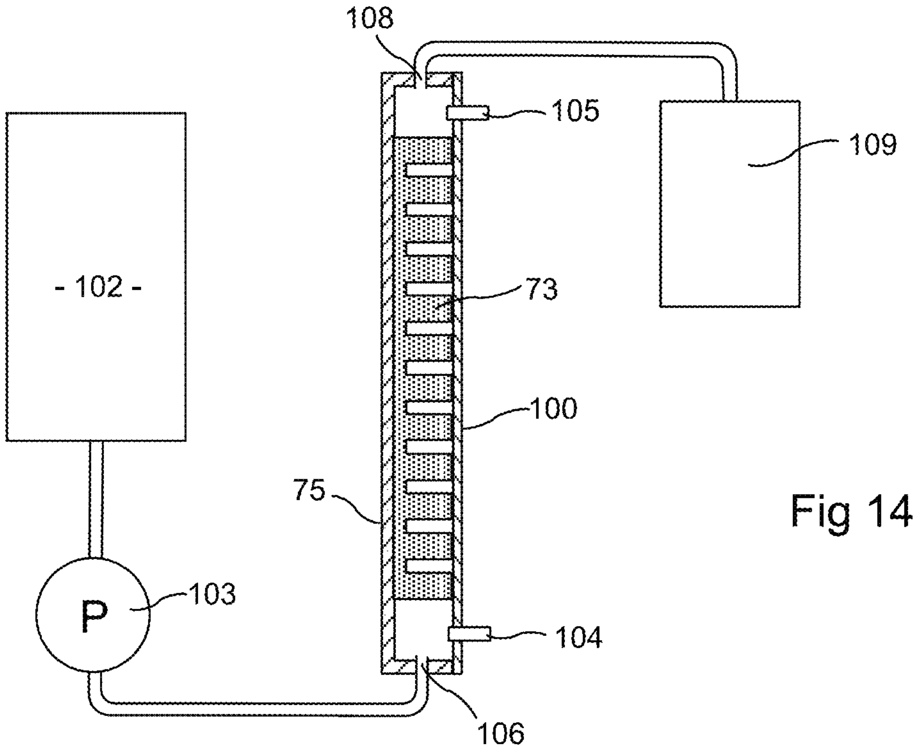
FIG. 14 is a diagrammatic view of apparatus to determine operating parameters for a system.

With embodiments as described above the flow rate through a heat transfer device or a half-cell which is required in order to cause elastic turbulence can be determined experimentally by observing pressure drop between the inlet and outlet of the heat transfer device or half-cell as flow rate is increased. FIG. 14 illustrates such a procedure using the structure of one of the half-cells of FIG. 10. The membrane and thin electrode are not present. Instead, a plate 100 is fitted against the pillars 30 of the flow guide 73. Pressure sensors 104, 105 are fitted at the inlet and outlet regions of the fluid path through the flow guide 73. The inlet 106 is connected to a pump 103 which delivers fluid from a tank 102. This fluid may be the same as the electrolyte fluid which will flow through the half-cell when it is in the flow battery. The outlet 108 is connected to a graduated vessel 109 for measuring volume of liquid which has been pumped through the half-cell in a chosen interval of time, and thereby determining the flow rate.

When liquid from the tank is pumped through the half-cell there will be a pressure drop between the inlet pressure sensor 104 and the outlet pressure sensor 105. When the flow rate is very low, the flow will be laminar, without any elastic turbulence. The minimum flow rate to cause elastic turbulence in the half-cell can be found by progressively increasing the pump speed to increase the flow rate and plotting the pressure drop against flow rate. This plot will show a change in slope on reaching the flow rate at which elastic turbulence begins.

Figure 15:
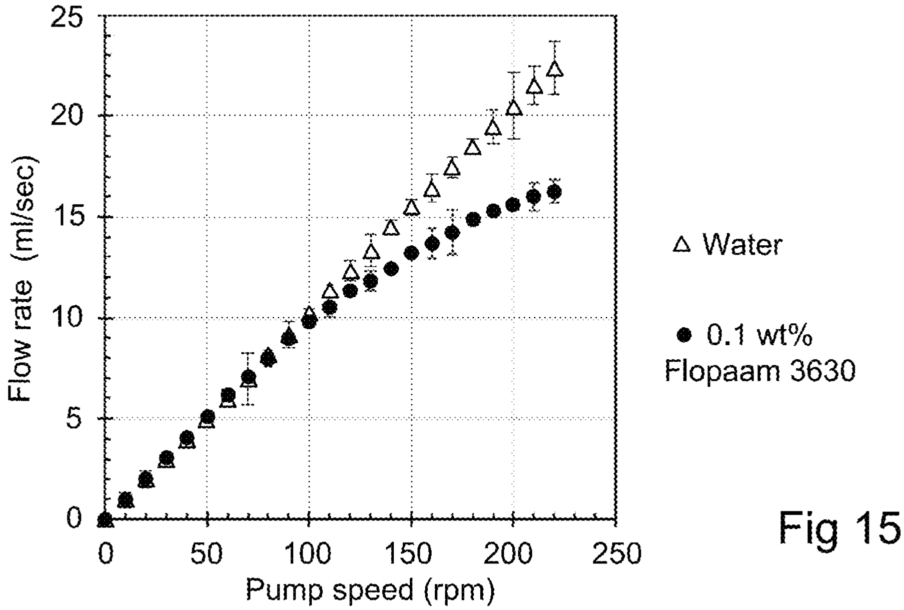
FIGS. 15 and 16 show experimental results obtained with an embodiment of such apparatus.

This is illustrated by the following description of experimental work with apparatus similar to that shown in FIG. 14. The results of the experiments are shown in FIGS. 14 and 15. An initial calibration determined relationships between pump speed and flow rate. The tank 102 was filled with water. The pump was used to propel water through the half-cell at progressively increasing flow rate. The pump speeds and the flow rates measured downstream of the half-cell were recorded and are shown in FIG. 15 (triangle points). This calibration procedure was then repeated with an aqueous solution containing 0.1 wt % of Flopaam 3630 polyacrylamide in the tank. This gave the non-linear plot also shown in FIG. 15 (circular points).

Figure 16:
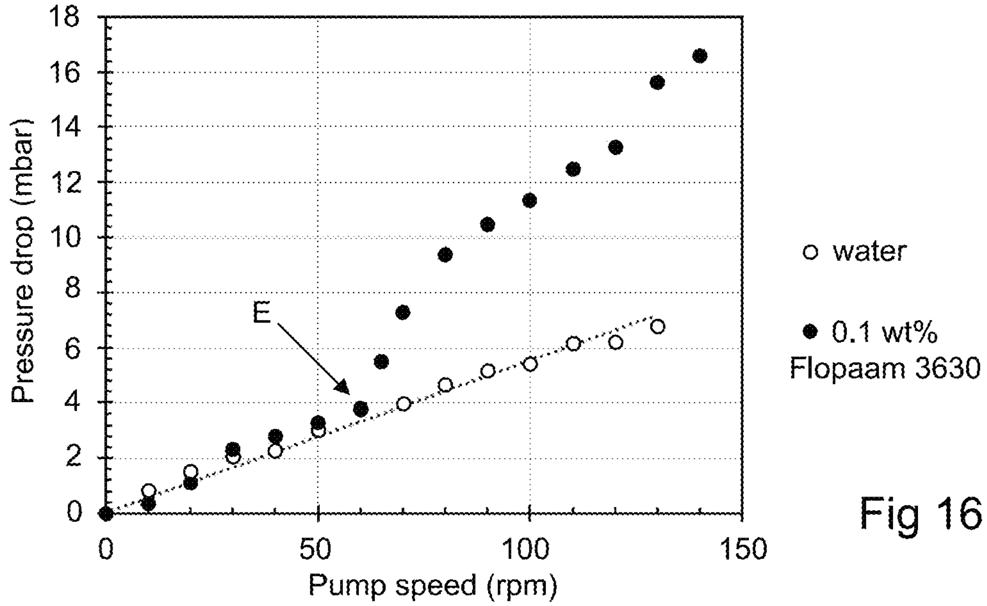

FIG. 16 shows the measured pressure drops plotted against flow rate as the flow rate was progressively increased. With water the plot was approximately linear (as would be expected because water is a Newtonian fluid) but with the polyacrylamide solution there was a very sharp change in the slope of the plot at the point E, indicating that the flow rate at this point was the minimum required to cause elastic turbulence with that polyacrylamide solution and apparatus.

Figure 6:
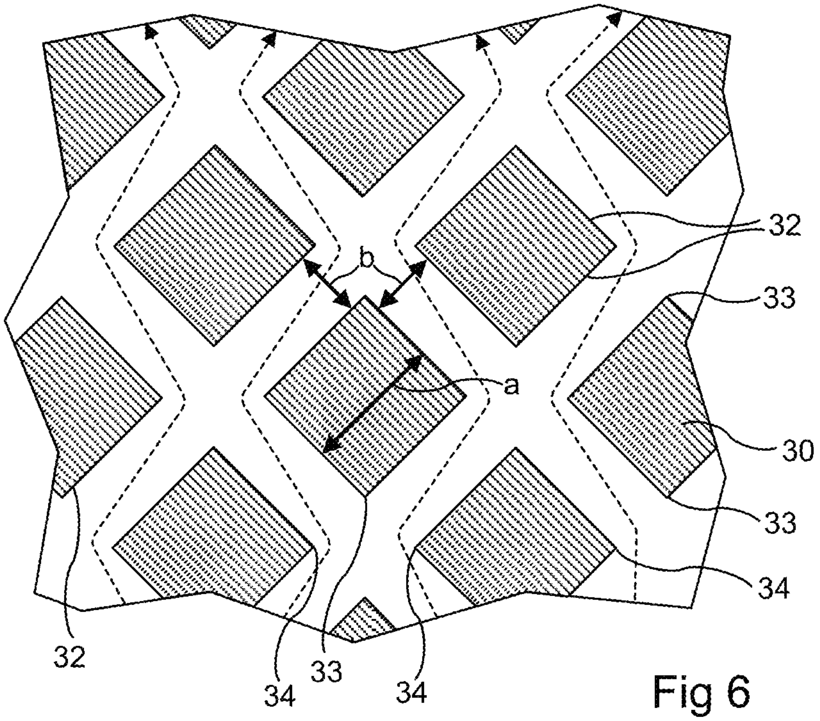
FIG. 6 is an enlargement of part of FIG. 5.

Measurements of this kind make it possible to estimate Reynolds number for flow through an array of pillars 30 as in FIGS. 4 to 6 or as in the flow guide 73 in FIGS. 10 to 13. The formula which may be used to determine Reynolds number (Re) for flow through a chamber containing obstructions so as to compel the flow streamlines to bend is:

$$Re = \frac{\rho UL}{\eta}$$

where ρ is density of the fluid in kilograms per cubic metre,

U is the flow velocity in meters per second,

L is the width of the gaps between the obstructions in the chamber, and

η is the viscosity of the fluid in Pascal.sec.

If the flow rate is measured as volume in unit time, the formula above becomes:

$$Re = \frac{\rho QL}{\eta A}$$

where Q is the flow rate in cubic meters per second and A is the cross sectional area, transverse to the overall direction of flow, through which the flow passes.

In an example of an array of pillars 30, the flat faces 32 of the pillars had a width "a" of 4 mm and the height of the pillars was 7 mm. The spacing "b" between the faces 32 of adjacent pillars was 2 mm and so the gaps between adjacent edges 34 was √8=2.83 mm. A full line of pillars transverse to the overall direction of flow contained 12 pillars with 11 gaps between edges 34, and so the cross section available for flow was:

$$11\times7\times2.83\ \text{mm}^2=11\times7.10^{-3}\times2.83.10^{-3}\ \text{m}^2.$$

Flow rate was measured as 75 $\text{ml}\cdot\text{sec}^{-1}=7.5\times10^{-5}\ \text{m}^3\ \text{sec}^{-1}$. Density of the fluid was 1000 kg/m3; viscosity was 0.008 Pa·sec. Putting these numbers into the formula mentioned above:

$$Re = \frac{\rho QL}{\eta A} = \frac{1000\times7.5\cdot10^{-5}\times2.83\cdot10^{-3}}{8.10^{-3}\times11\times7.10^{-3}\times2.83\cdot10^{-3}}$$

which is Re=12.17.

It is envisaged that embodiments of this disclosure may be operated with flow rates and geometries for causing elastic turbulence which give Reynolds number in a range from 1 to 1000, and possibly from 1 to 250 or 1 to 500.

The various embodiments of this disclosure which have been set out above are intended to assist understanding of this disclosure, but not to limit in any way the scope of this disclosure as defined by the following claims. It should be appreciated that any features or possibilities described in combination may, where it is practical to do so, be used individually. Also, features or possibilities mentioned in the following claims or described in any embodiment may be used in any other embodiment, in so far as it is practical to do so and in particular where two or more of the following claims are dependent on the same preceding claim, the reader should understand that the present disclosure includes any possible combination of any two or more or all of those dependent claims with each other and with that preceding claim.

The invention claimed is:

1. A fluid composition able to exhibit elastic turbulence when flowing, which is a solution of two or more polymers comprising:

at least one dissolved first polymer which is a linear polymer having a weight average molecular weight of at least 10 MegaDaltons;

at least one dissolved second polymer which is a linear polymer having a weight average molecular weight in a range from 0.25 to 5 MegaDaltons; and wherein the amount of the first polymer is in a range from 0.05 to 5 wt % of the solution and is sufficient such that a solution containing the first polymer without the second polymer can display elastic turbulence, and wherein the amount of the second polymer is greater than the amount of the first polymer but is not more than 10 wt % of the solution.

2. The fluid composition of claim 1, wherein the first polymer comprises at least one linear chain containing at least 20,000 monomer units connected by single chemical bonds.

3. The fluid composition of claim 1, wherein the second polymer comprises at least one linear chain containing at least 2,000 monomer units connected by single chemical bonds.

4. The fluid composition of claim 1, wherein the first polymer comprises at least one linear chain with length and composition corresponding to at least 5,000 Kuhn monomers with a Kuhn length not more than 100 Angstroms.

5. The fluid composition of claim 1, wherein the second polymer comprises at least one polymer chain with length and composition corresponding to at least 100 Kuhn monomers with a Kuhn length not more than 100 Angstroms.

6. The fluid composition of claim 1, wherein the first polymer comprises at least one linear polymer chain with a chain length of at least 50,000 monomer units and with a Kuhn length not more than 100 Angstroms, and the second polymer contains at least one linear polymer chain with a chain length of at least 5,000 monomer units with a Kuhn length not more than 100 Angstroms.

7. The fluid composition of claim 1, wherein the first polymer is polyacrylamide or partially hydrated polyacrylamide having a weight average molecular weight of at least 15 MegaDaltons.

8. The fluid composition of claim 1, wherein the concentration of the first polymer is not more than 1 wt %.

9. The fluid composition of claim 1, wherein the second polymer is polyacrylamide or partially hydrated polyacrylamide having a weight average molecular weight of 1 to 5 MegaDaltons.

10. The fluid composition of claim 1, wherein the concentration of the second polymer is more than 1 wt % and is at least twice the concentration of the first polymer.

11. The fluid composition of claim 1, wherein the concentration of the second polymer is at least three times the concentration of the first polymer.

12. A system comprising a fluid-containing structure defining a fluid flow path comprising a chamber with an inlet and an outlet and with internal obstructions to compel stream lines of fluid flow to change direction, and piping leading to the inlet of the chamber and from the outlet of the chamber; wherein the system also comprises at least one pump for propelling fluid through the piping and the chamber and wherein the structure contains a fluid composition in accordance with claim 1.

13. The system of claim 12, wherein the fluid flow path is a circuit.

14. The system of claim 12, wherein the chamber is part of a heat transfer device, where a wall of the chamber, in contact with fluid flowing through the chamber is an interface through which heat is conducted to or from the fluid flowing through the chamber.

15. The system of claim 12, wherein the chamber is part of an electrochemical half-cell and the fluid comprises at least one chemical species able to undergo an electrochemical reaction at an electrode of the electrochemical half-cell.

16. A method of operating the system of claim 12 comprising: pumping the fluid through the piping and the chamber at a flow rate such that the fluid is in laminar flow without elastic turbulence in piping leading to the chamber and is in a state of elastic turbulence within the chamber.

17. The method of claim 16, wherein Reynolds number for flow through the piping leading to the chamber is in a range from 1 to 250.

18. The method of claim 16, wherein Reynolds number for flow in a state of elastic turbulence through the chamber is in a range from 1 to 500.

19. A method of moving heat into or out of a flowing fluid, comprising:

pumping the fluid through a heat transfer device which comprises a chamber for through flow of fluid and wherein a chamber wall in contact with the flowing fluid is an interface through which heat energy is transferred to or from the flowing fluid, wherein the chamber comprises an array of spaced obstructions compelling the streamlines of the flowing fluid to repeatedly change direction in order to flow through gaps between the obstructions;

the fluid is a composition according to claim 1; and the flow rate of the fluid in the chamber is such that the flowing fluid is in a state of elastic turbulence.

20. A method of operating a flowing electrochemical half-cell with an electrode in contact with a flow path for a fluid comprising a constituent able to undergo electrochemical reaction at the electrode, wherein:

the fluid is a composition according to claim 1, the flow path in contact with the electrode causes changes in the direction of flow, and the method comprises pumping the fluid along the flow path with the fluid in a condition of elastic turbulence while it is in contact with the electrode.

* * * * *